(12) United States Patent
Desai

(10) Patent No.: US 10,353,873 B2
(45) Date of Patent: *Jul. 16, 2019

(54) DISTRIBUTED FILE SYSTEMS ON CONTENT DELIVERY NETWORKS

(71) Applicant: EMC IP Holding Company LLC, Hopkinton, MA (US)

(72) Inventor: Rajiv Desai, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,775

(22) Filed: Jul. 10, 2018

(65) Prior Publication Data

US 2018/0322141 A1    Nov. 8, 2018

Related U.S. Application Data

(63) Continuation of application No. 14/671,675, filed on Mar. 27, 2015, now Pat. No. 10,021,212.

(60) Provisional application No. 62/088,427, filed on Dec. 5, 2014.

(51) Int. Cl.
*G06F 15/16* (2006.01)
*G06F 16/182* (2019.01)
*H04L 29/08* (2006.01)

(52) U.S. Cl.
CPC ........ *G06F 16/182* (2019.01); *H04L 67/2804* (2013.01); *H04L 67/1097* (2013.01)

(58) Field of Classification Search
CPC ............. H04L 67/2804; H04L 67/1097; G06F 17/30194
See application file for complete search history.

(56) References Cited

U.S. PATENT DOCUMENTS

| | | | | |
|---|---|---|---|---|
| 6,091,518 | A | * | 7/2000 | Anabuki ............ H04N 1/32122 358/442 |
| 6,289,345 | B1 | | 9/2001 | Yasue |
| 6,324,492 | B1 | | 11/2001 | Rowe |
| 6,434,608 | B1 | | 8/2002 | Desai et al. |
| 6,434,609 | B1 | | 8/2002 | Humphrey |
| 6,658,533 | B1 | | 12/2003 | Bogin |
| 6,959,339 | B1 | * | 10/2005 | Wu .................... G06F 17/30864 707/999.003 |
| 7,590,803 | B2 | | 9/2009 | Wintergerst |
| 7,685,463 | B1 | | 3/2010 | Linnell |
| 8,260,913 | B2 | * | 9/2012 | Knapp .................... H04L 67/16 709/202 |

(Continued)

OTHER PUBLICATIONS

U.S. Appl. No. 14/671,740, filed Mar. 27, 2015, Rajiv Desai, et al.

(Continued)

*Primary Examiner* — Moustafa M Meky
(74) *Attorney, Agent, or Firm* — Workman Nydegger

(57) ABSTRACT

A method, article of manufacture, and apparatus for accessing a distributed file system using a content delivery network is discussed. An IO request for an object is received at a metadata server comprising metadata mapping a plurality of objects to an object store. An object identifier associated with the object and a CDN domain associated with the object store are determined. A URL is generated from the object identifier and the CDN domain. The URL is then returned to the client.

20 Claims, 4 Drawing Sheets

(56) References Cited

U.S. PATENT DOCUMENTS

| | | | |
|---|---|---|---|
| 8,984,144 B2 * | 3/2015 | Schapira | H04L 67/2804 709/227 |
| 9,280,683 B1 | 3/2016 | Echeverria | |
| 9,286,331 B2 * | 3/2016 | Knapp | G06F 17/302 |
| 9,426,071 B1 | 8/2016 | Caldejon | |
| 9,898,477 B1 | 2/2018 | Panghal | |
| 10,021,212 B1 * | 7/2018 | Desai | H04L 67/2804 |
| 2002/0138559 A1 | 9/2002 | Ulrich | |
| 2003/0005084 A1 | 1/2003 | Humphrey | |
| 2004/0064485 A1 * | 4/2004 | Yoshida | G06F 21/62 |
| 2004/0255048 A1 | 12/2004 | Lev Ran et al. | |
| 2005/0262150 A1 | 11/2005 | Krishnaswamy | |
| 2006/0036602 A1 | 2/2006 | Unangst | |
| 2006/0200623 A1 | 9/2006 | Gonzalez | |
| 2006/0277196 A1 * | 12/2006 | Oosawa | G06F 17/30887 |
| 2007/0094354 A1 | 4/2007 | Soltis | |
| 2007/0168542 A1 * | 7/2007 | Gupta | G06Q 30/0242 709/231 |
| 2007/0171562 A1 | 7/2007 | Maejima | |
| 2007/0174333 A1 | 7/2007 | Lee | |
| 2007/0179981 A1 | 8/2007 | Vincent | |
| 2007/0237086 A1 | 10/2007 | Tulac | |
| 2008/0195483 A1 * | 8/2008 | Moore | G06F 17/3089 705/14.69 |
| 2009/0083494 A1 | 3/2009 | Bhanoo | |
| 2010/0042743 A1 | 2/2010 | Jeon | |
| 2010/0161657 A1 | 6/2010 | Cha | |
| 2010/0293336 A1 | 11/2010 | Shribman | |
| 2010/0299447 A1 | 11/2010 | Salvi | |
| 2010/0332401 A1 | 12/2010 | Prahiad | |
| 2010/0332456 A1 | 12/2010 | Prahiad | |
| 2011/0145189 A1 | 6/2011 | Zheng et al. | |
| 2011/0258461 A1 | 10/2011 | Bates | |
| 2012/0054152 A1 | 3/2012 | Adkins | |
| 2012/0151016 A1 | 6/2012 | Wein | |
| 2012/0226770 A1 * | 9/2012 | Schapira | H04L 67/2804 709/217 |
| 2012/0254116 A1 | 10/2012 | Thereska | |
| 2012/0311248 A1 | 12/2012 | Goodman | |
| 2013/0060884 A1 | 3/2013 | Bernbo | |
| 2013/0110906 A1 | 5/2013 | Zearing | |
| 2013/0238752 A1 | 9/2013 | Park et al. | |
| 2013/0290284 A1 | 10/2013 | Knapp | |
| 2014/0039818 A1 | 2/2014 | Arya | |
| 2014/0040412 A1 | 2/2014 | Yanagihara | |
| 2014/0165119 A1 * | 6/2014 | Liu | H04N 21/232 725/92 |
| 2014/0189432 A1 | 7/2014 | Gokhale | |
| 2015/0161048 A1 | 6/2015 | Patil et al. | |
| 2015/0180968 A1 * | 6/2015 | Schapira | H04L 67/2804 709/203 |
| 2015/0249709 A1 | 9/2015 | Teng et al. | |
| 2015/0277802 A1 | 10/2015 | Oikarinen | |
| 2015/0280959 A1 | 10/2015 | Vincent | |
| 2015/0350106 A1 | 12/2015 | Whalley | |
| 2016/0011816 A1 | 1/2016 | Aizman | |
| 2016/0092354 A1 | 3/2016 | Steely | |
| 2016/0239397 A1 | 8/2016 | Thomas | |
| 2016/0269501 A1 | 9/2016 | Usgaonkar | |
| 2016/0292429 A1 | 10/2016 | Manville et al. | |
| 2016/0337426 A1 | 11/2016 | Shribman | |
| 2016/0357450 A1 | 12/2016 | Rao et al. | |
| 2016/0364407 A1 | 12/2016 | Hong | |
| 2017/0004082 A1 | 1/2017 | Sehgal | |

OTHER PUBLICATIONS

U.S. Appl. No. 14/673,071, filed Mar. 30, 2015, Rajiv Desai, et al.
U.S. Appl. No. 14/864,399, filed Sep. 24, 2015, Vijay Panghal.
U.S. Appl. No. 14/864,425, filed Sep. 24, 2015, Vijay Panghal.
U.S. Appl. No. 14/865,333, filed Sep. 25, 2015, Vijay Panghal, et al.
U.S. Appl. No. 14/978,424, filed Dec. 22, 2015, Vijay Panghal, et al.
U.S. Appl. No. 14/978,480, filed Dec. 22, 2015, Vijay Panghal, et al.
U.S. Appl. No. 14/978,520, filed Dec. 22, 2015, Vijay Panghal, et al.
U.S. Appl. No. 15/199,599, filed Jun. 30, 2016, Rajiv Desai, et al.
U.S. Appl. No. 15/199,617, filed Jun. 30, 2016, Rajiv Desai, et al.
U.S. Appl. No. 15/199,624, filed Jun. 30, 2016, Rajiv Desai, et al.
U.S. Appl. No. 15/388,805, filed Dec. 22, 2016, Shrinand Javadekar, et al.

* cited by examiner

DISTRIBUTED FILE SYSTEMS ON CONTENT DELIVERY NETWORKS

CROSS REFERENCE TO RELATED APPLICATIONS

This application is a Continuation of U.S. application Ser. No. 14/671,675 filed Mar. 27, 2015 which claims priority to U.S. Provisional Patent Application 62/088,427, filed Dec. 5, 2014, which applications are incorporated herein by reference for all purposes.

FIELD OF THE INVENTION

This invention relates generally to distributed file systems, and more particularly to systems and methods for accessing distributed file systems using content delivery networks.

BACKGROUND OF THE INVENTION

Distributed file systems manage files and folders spread across multiple computers. They may serve a similar function as traditional file systems, but are designed to provide file/folder storage and controlled access over local and wide area networks. Some individuals and/or enterprises may rely on distributed file systems to manage their personal and/or organizational data.

There is a need, therefore, for an improved method, article of manufacture, and apparatus for accessing a distributed file system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
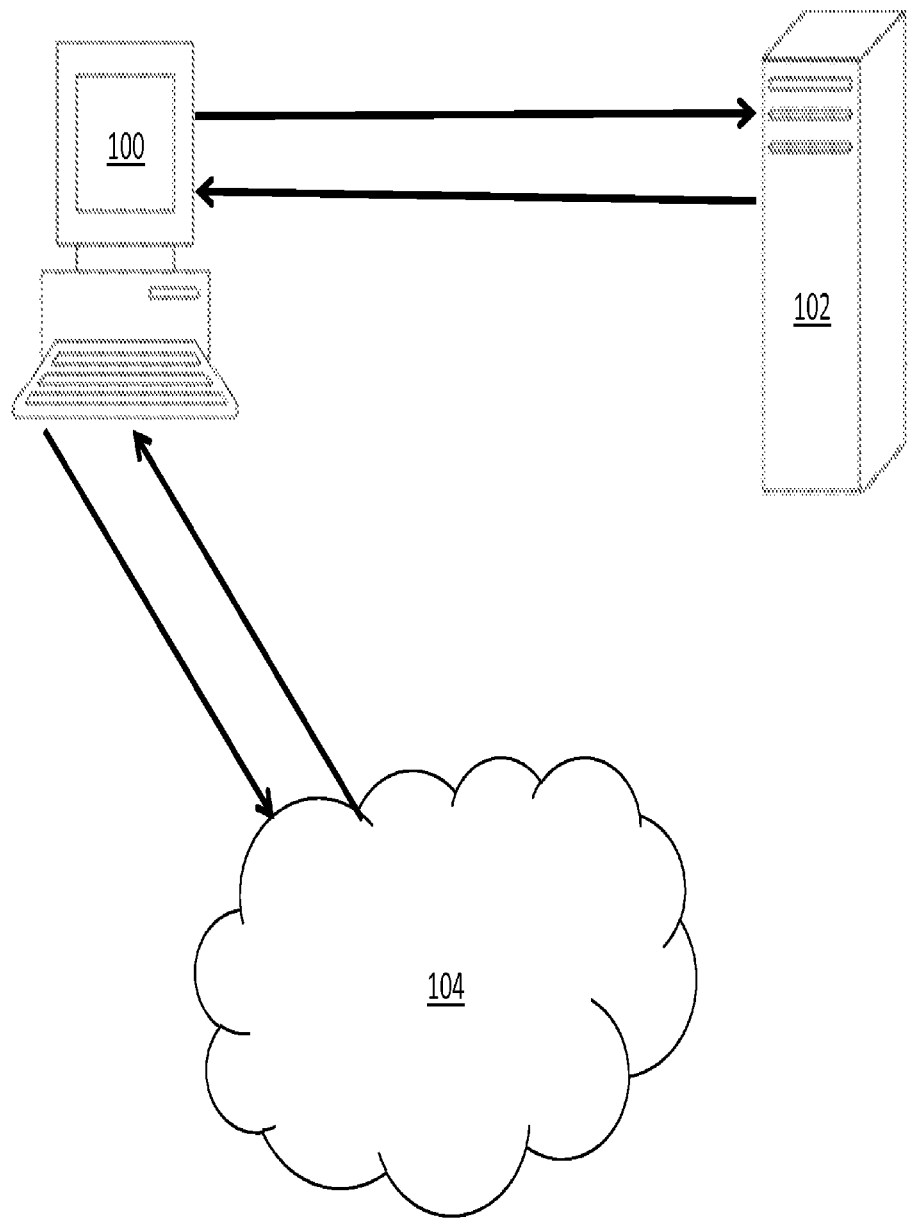
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure enable accessing a distributed file system operating in a cloud environment using a content delivery network ("CDN"). Distributed files systems may be used to manage files, folders, and other data spread across multiple computing systems. They may be presented to users, applications, or other clients as traditional file systems, but may actually provide access to data over local and wide area networks. For example, the data could be store in a cloud based object stores, such as Amazon S3, Microsoft Azure, Google Drive, a private object store, and/or a hybrid object store. Access to the data on these object stores may be managed by a metadata server, which could be a local or remote server from the client.

While cloud based object stores may create the appearance of a single object store, the data may actually be physically stored across multiple datacenters that are geographically separate. For example, portions of data may be stored at datacenters in both California and Arizona, while still being part of the same logical object store. A client wishing to access the data may therefore need to access both datacenters. If a client is physically located in California, however, the client may wish to read as much data as possible from the California datacenter to achieve optimal performance. CDNs may help provide these performance benefits.

In an embodiment, a CDN is a distributed system of servers deployed in multiple datacenters in a cloud environment. In the above example, the CDN may comprise servers deployed in both the California and Arizona datacenters. Additionally or alternatively, a service provider unrelated to the cloud service provider may provide CDN servers. In some embodiments, CDN servers operate as both a proxy and a cache in the distributed file system. If a client reads data from an object store, a CDN server may first process the read request. If the data is on the CDN server, it may be returned to the client without accessing the remote datacenter. If the data is not on the CDN server, the request may be forwarded to the remote data center and the data may be returned through the CDN to the client. In an embodiment, when the data is returned to the client it may also be stored on the CDN server and/or a local datacenter associated with the CDN for future access. Similarly, a client may attempt to write data to the CDN. The CDN may dynamically determine the optimal datacenter for the client, and forward the write request to that datacenter.

FIG. 1 depicts a system implementing a distributed file system in a cloud environment which may operate using a CDN. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Additionally or alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be a Microsoft Azure install operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other type of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST or PUT. The POST or PUT request may include the data object client 100 wishes to store on object store 104. Client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. The data chunks may be uniquely addressable and immutable, meaning they are not changed on the object store once they have been written. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
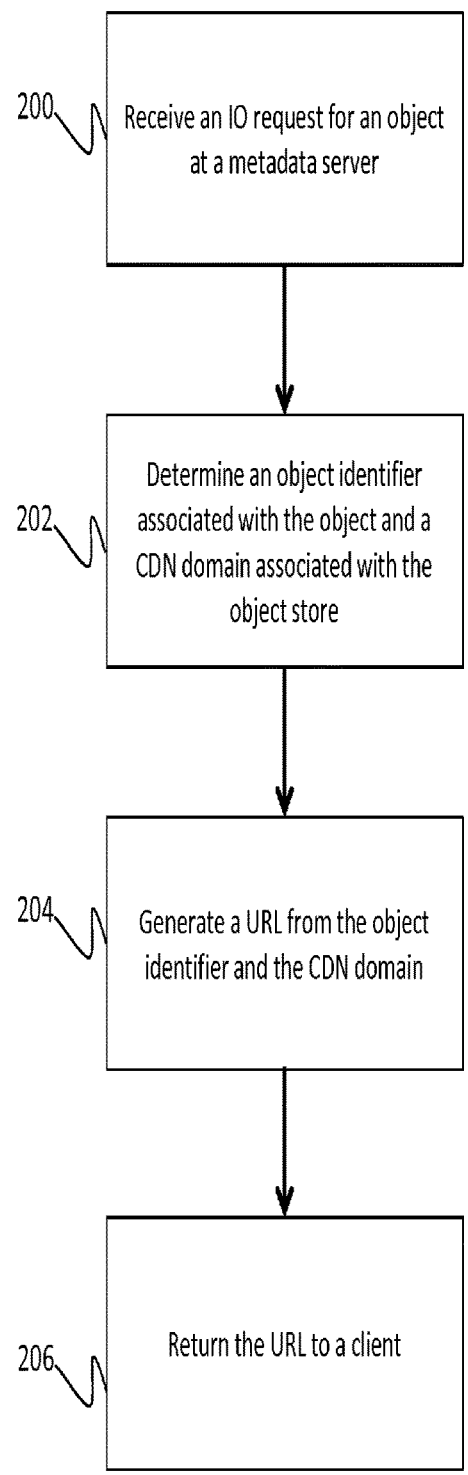
FIG. 2 depicts a process for handling IOs consistent with an embodiment of the present disclosure.

Turning now to FIG. 2, a process for accessing a distributed file system using a CDN is discussed. In some embodiments, this process may operate on a system substantially similar to FIG. 1. The CDN may provide the benefits of the distributed file system, while providing performance optimizations for geographically diverse clients and/or data centers.

A block 200, an IO request may be received at a metadata server. This IO request may be transmitted to the metadata server from a client, and may be a read and/or a write request. The IO request may be for a data object and/or a portion of a data object. In some embodiments, this data object is a file and/or a folder stored on the distributed file system.

At 202, an object identifier may be determined. The object identifier may be any piece of information capable of uniquely identifying the requested object, or a portion thereof, on the distributed file system. For example, it may be a path and/or a hash of the object. In some embodiments, this identifier is provided to the metadata server from the client as part of the IO request.

Block 202 may also determine a CDN domain. The CDN domain may be a domain for the content delivery network, and may be used to access data on the object store through the CDN. In some embodiments, the CDN domain is stored on the MDS and associated with a particular object store and/or an container on that object store. For example, Amazon S3, Microsoft Azure, and a private cloud may be associated with different CDN domains. The MDS may determine which object store holds the requested data object, such as by consulting a metadata table as discussed above, and then identify the CDN domain associated with that object store.

At block 204, a URL may be generated from both the object identifier and the CDN domain. In some embodiments, this URL may be substantially similar to that discussed above. Rather than an object store domain, however, the URL may use the CDN domain discussed in reference to block 202. For example, the URL may be "http://<CDN domain>/<container identifier>/<object identifier>" where CDN domain is the CDN domain associated with the object store. As a result, clients accessing the URL may be directed to the CDN rather than directly to the object store itself. This may provide the benefits of the CDN, as discussed above, to the distributed file system.

Finally, at block 206, the URL may be returned to the client. In some embodiments multiple URLs may be returned to the client, as discussed below. The client may then use the URL to access the object store via the CDN for the desired IO operations.

Figure 3:
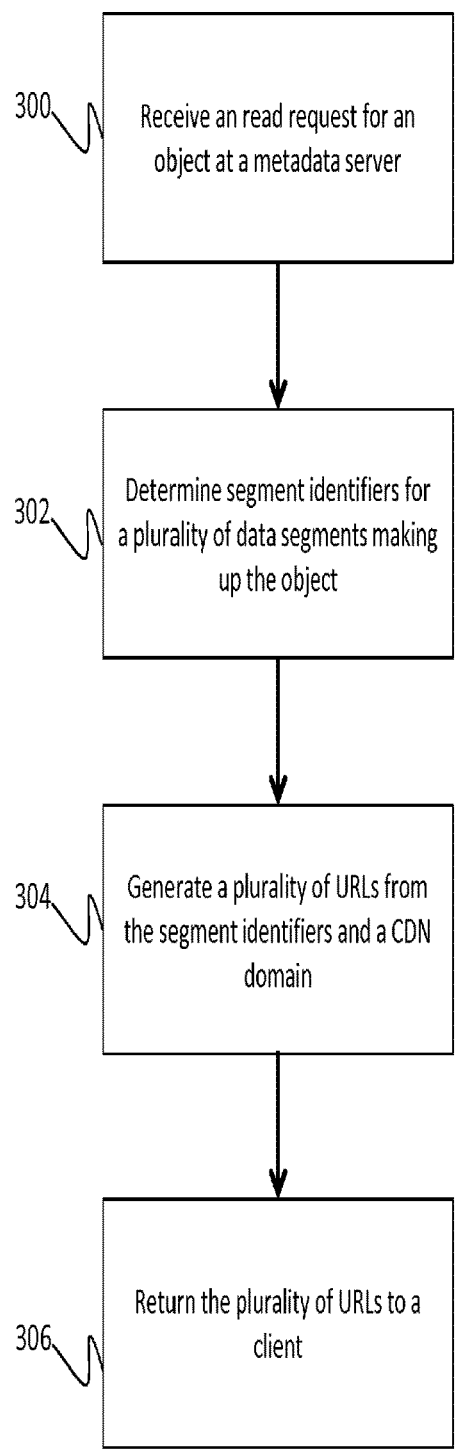
FIG. 3 depicts a process for handling read requests consistent with an embodiment of the present disclosure.

FIG. 3 depicts a process for handling a read request for data stored in a distributed file system using a CDN. In some embodiments, this read request may be similar to the read request discussed in reference to FIG. 1 and the IO request discussed in reference to FIG. 2. The read request may be for a single data object that is comprised of individual data segments A block 300, a read request may be received at a MDS. This read request may be received from a client, and in an embodiment identifies one or more data objects, or portions thereof, the client wishes to read.

At block 302, segment identifiers for a plurality of data segments may be identified. A single data object, such as a file, may be divided into a plurality of constituent segments prior to storing the data object to the object store. This division may occur at the client and/or at the MDS. These data segments may each be associated with an identifier, such as a hash, used to read the data segment in the future. When a client wishes to read a data object it may therefore be necessary to identify all the data segments that make up that object. The segment identifiers for the segments may be identified in multiple ways. For example, the segment identifiers may be provided to the MDS from the client, where the segment identifiers collectively make the object identifier. Additionally or alternatively, the MDS may comprise records of segment identifiers mapped to an object identifier and may determine the segment identifiers by consulting those records.

At block 304, a plurality of URLs may be generated using the segment identifiers and a CDN domain. This CDN domain may be determined in a manner substantially similar to that discussed above. In some embodiments, the URLs may be similar to those discussed in reference to FIG. 1, but may replace the object store domain with the CDN domain and the object identifier with the segment identifiers. For example, a URL may be "http://<CDN domain>/<container identifier>/<segment identifier>" and one URL may be generated for each segment identifier.

Finally, at block 306 the URLs may be returned to the client. The client may thereafter use these URLs to retrieve the data segments from the CDN and/or the object store, and reconstruct the data object locally.

Figure 4:
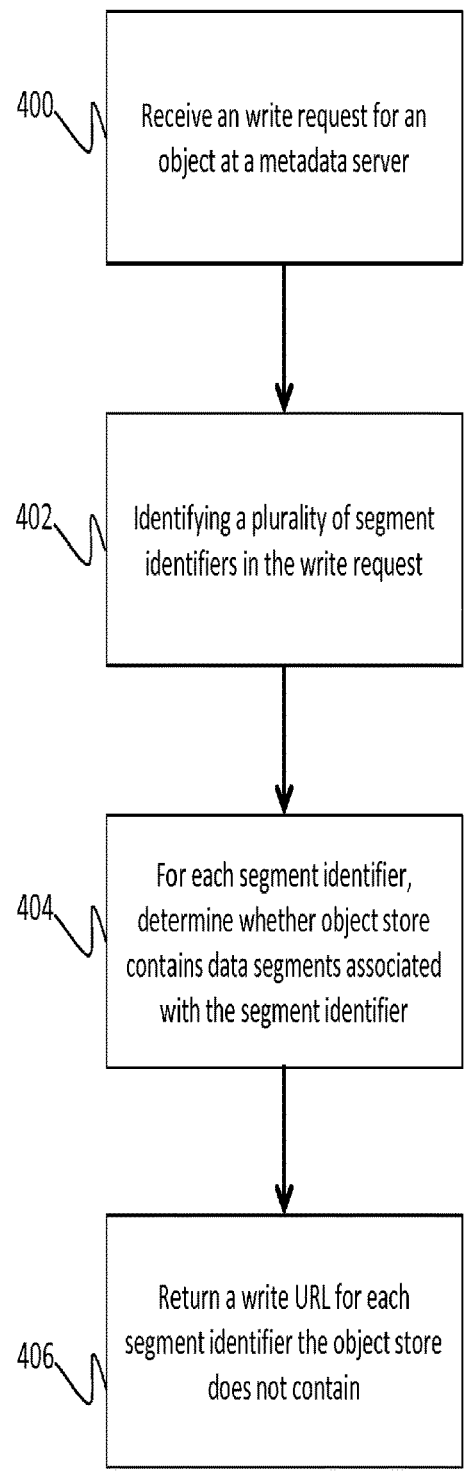
FIG. 4 depicts a process for handling write requests consistent with an embodiment of the present disclosure.

Turning now to FIG. 4, a process for writing data to a distributed file system using a CDN is discussed. This process may be similar to handling an IO request as discussed in reference to FIG. 2, and may operate on a system similar to that discussed in reference to FIG. 1.

At 400, a write request may be received at a MDS. This write request may be received from a client, and may indicate the client has data it wishes to write to the distributed file system. In some embodiments, this data may be a new data object, such as a new file, or it may be an update to an existing data object.

At block 402, a plurality of segment identifiers for the data may be determined. In an embodiment, data objects may be divided into multiple data segments, and each segment may be associated with an identifier. The client could, for example, provide these segment identifiers to the MDS. This allows the MDS to process the write request without actually seeing the data to be written to the object store.

At block 404, an additional check is made to determine whether the object store already contains the data segments associated with the segment identifiers. For example, if the write request is an update to an existing file, much of the data may already exist in the object store. The MDS may compare each of the data segment identifiers to a metadata table to see if they are already associated with an object store. If they are, that data segment identifier may be removed from the list of data segment identifiers because it does not need additional processing. If the metadata does not contain a particular data segment identifier, that data segment may need to be written to the object store.

Finally, at block 406, a write URL for each data segment that does not exist in the object store may be generated. In some embodiments the URL comprises both the CDN domain and a segment identifier. The URL could be, for example, "http://<CDN domain>/<container identifier>/<segment identifier>". Generating URLs only for segments (i.e. chunks) that do not exist in the object store may be particularly helpful when only a portion of a file on the distributed file system is edited. Rather than changing the segment as it already exists, an new segment is stored.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for accessing data using a content delivery network (CDN), the CDN including a plurality of datacenters that are in different locations, the method comprising:
receiving an IO request for an object at a metadata server from a client, wherein the metadata server comprises metadata mapping a plurality of objects to an object store;
determining an object identifier associated with the requested object and the CDN domain associated with the object store;
generating a URL from the object identifier and the CDN domain; and
returning the URL to the client;
requesting the data object from the CDN domain using the URL, wherein the CDN domain is configured to access the data object from a datacenter that is optimal for the client.

2. The method of claim 1, further comprising mapping the plurality of objects to multiple object stores, wherein the CDN comprises a plurality of different datacenters that are part of a logical object store.

3. The method of claim 1, wherein the CDN comprises at least some servers that act as both a proxy and as a cache in the object store.

4. The method of claim 1, further comprising mounting at least a portion of the CDN domain.

5. The method of claim 4, further comprising changing a directory or location by sending a request to the metadata server.

6. The method of claim 1, wherein the requested object includes a plurality of data segments and the IO request is a write request.

7. The method of claim 6, further comprising:
determining segment identifiers for each of the plurality of data segments;
determining whether the object store contains data segments for each of the segment identifiers;
generating a plurality of URLs from the segment identifiers and the CDN domain; and
returning the plurality of URLs to the client.

8. The method of claim 7, further comprising determining at the metadata server whether the object store contains each of the data segments.

9. The method of claim 8, wherein the URL comprises a plurality of write URLs for the data segments the object store does not contain.

10. The method of claim 9, further comprising writing the data segments the object store does not contain to the object store and updating the metadata server by creating a new entry for each of the data segments the object store does not contain at the metadata server.

11. A non-transitory computer readable storage medium comprising processor instructions for accessing data using a content delivery network (CDN), the instructions comprising:
receiving an IO request for an object at a metadata server from a client, wherein the metadata server comprises metadata mapping a plurality of objects to an object store;

determining an object identifier associated with the requested object and the CDN domain associated with the object store;

generating a URL from the object identifier and the CDN domain; and returning the URL to the client;

requesting the data object from the CDN domain using the URL, wherein the CDN domain is configured to access the data object from a datacenter that is optimal for the client.

12. The method of claim 11, further comprising mapping the plurality of objects to multiple object stores, wherein the CDN comprises a plurality of different datacenters that are part of a logical object store.

13. The method of claim 11, wherein the CDN comprises at least some servers that act as both a proxy and as a cache in the object store.

14. The method of claim 11, further comprising mounting at least a portion of the CDN domain.

15. The method of claim 14, further comprising changing a directory or location by sending a request to the metadata server.

16. The method of claim 11, wherein the requested object includes a plurality of data segments and the IO request is a write request.

17. The method of claim 16, further comprising:

determining segment identifiers for each of the plurality of data segments;

determining whether the object store contains data segments for each of the segment identifiers;

generating a plurality of URLs from the segment identifiers and the CDN domain; and returning the plurality of URLs to the client.

18. The method of claim 17, further comprising determining at the metadata server whether the object store contains each of the data segments.

19. The method of claim 18, wherein the URL comprises a plurality of write URLs for the data segments the object store does not contain.

20. The method of claim 19, further comprising writing the data segments the object store does not contain to the object store and updating the metadata server by creating a new entry for each of the data segments the object store does not contain at the metadata server.

* * * * *